W. B. ARNOLD.
PEG-FLOAT.
No. 190,114. Patented May 1, 1877.
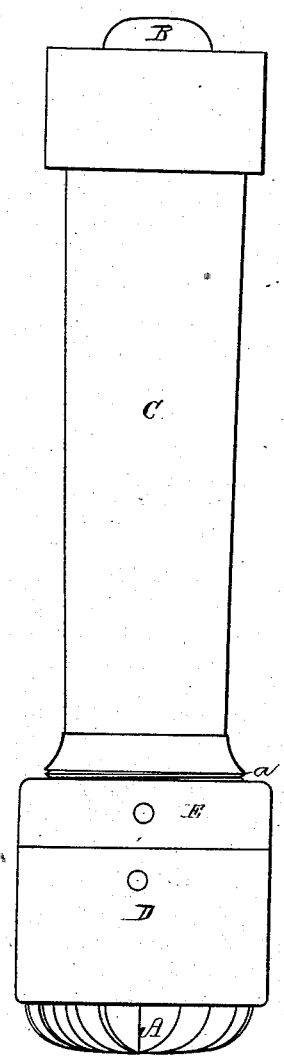
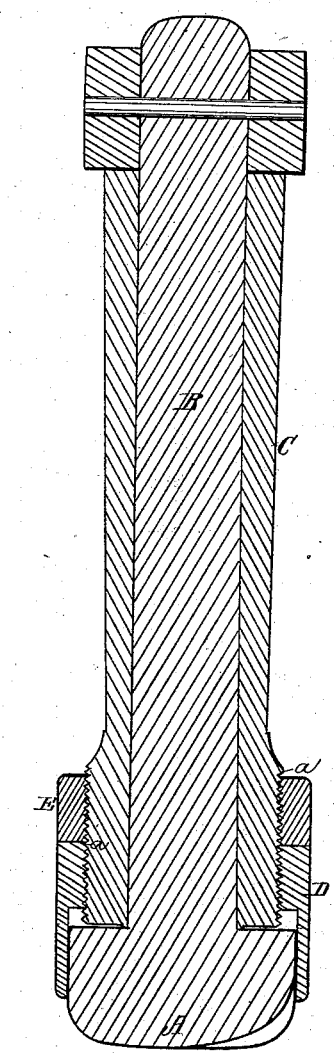
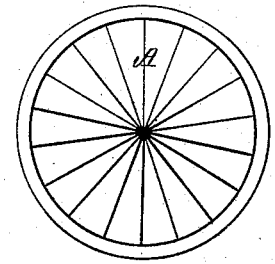
Witnesses:
Inventor:
William B. Arnold.
by his attorney
R. H. Eddy.

UNITED STATES PATENT OFFICE.

WILLIAM B. ARNOLD, OF NORTH ABINGTON, MASSACHUSETTS.

IMPROVEMENT IN PEG-FLOATS.

Specification forming part of Letters Patent No. 190,114, dated May 1, 1877; application filed March 21, 1877.

*To all whom it may concern:*

Be it known that I, WILLIAM B. ARNOLD, of North Abington, of the county of Plymouth and State of Massachusetts, have invented a new and useful Improvement in Shoe-Peg Raspers; and do hereby declare the same to be described in the following specification, and represented in the accompanying drawings, of which—

Figure 1 is a side view, Fig. 2 an end view, and Fig. 3 a longitudinal section, of a rasper provided with my invention.

My invention consists in the construction of an adjustable gage and its clamp-nut and screw, with the rotary rasper, its arbor, and tubular arbor-carrier, all being substantially as described and shown.

In the drawings, A denotes a rasper of the common kind fixed to the end of an arbor, B, arranged within a tubular arm or carrier, C.

On this carrier there is cut or formed a male screw, a, in which is screwed the adjustable gage D, which is a short tube or sleeve, that surrounds the rasper. Besides the gage there is on the screw a check-nut, E, to screw against the inner end of the gage.

By revolving the gage it will be moved also in the direction of the axis of the arbor and may be adjusted to the rasper as occasion may require, after which, by turning the nut firmly up against the gage, the latter will be held in its position.

I claim—

The combination of the adjustable gage D, its check-nut E, and screw *a* with the rotary peg-rasper A, and its arbor B, and the carrier C thereof, all being arranged substantially as set forth.

WILLIAM B. ARNOLD.

Witnesses:
R. H. EDDY,
J. R. SNOW.